United States Patent
Di Monte, Sr.

(10) Patent No.: US 9,797,120 B1
(45) Date of Patent: Oct. 24, 2017

(54) ANTI-AIR LOCK NEGATIVE AND/OR VACUUM PRESSURE AIR ADMITTANCE CONNECTOR

(71) Applicant: AA Anti-Air-Lock Corp, Iselin, NJ (US)

(72) Inventor: Michael Anthony Di Monte, Sr., Cream Ridge, NJ (US)

(73) Assignee: AA Anti-Air-Lock Corp

( * ) Notice: Subject to any disclaimer, the term of this patent is extended or adjusted under 35 U.S.C. 154(b) by 0 days.

(21) Appl. No.: 15/132,131

(22) Filed: Apr. 18, 2016

(51) Int. Cl.
*F16K 15/04* (2006.01)
*E03C 1/122* (2006.01)
*E03F 5/08* (2006.01)

(52) U.S. Cl.
CPC .............. *E03C 1/1225* (2013.01); *E03F 5/08* (2013.01); *F16K 15/04* (2013.01)

(58) Field of Classification Search
CPC .................................. E03F 5/08; F16K 15/04
USPC ............................................ 137/533.11, 539
See application file for complete search history.

(56) References Cited

U.S. PATENT DOCUMENTS

| | | | |
|---|---|---|---|
| 1,306,576 A * | 6/1919 | Brown | F16K 15/04 137/533.11 |
| 5,613,513 A * | 3/1997 | Makowan | F16K 24/046 137/1 |
| 6,234,198 B1 | 5/2001 | Chalich | |
| 7,140,388 B2 | 11/2006 | Chalich | |
| 2003/0062086 A1 | 4/2003 | Chalich | |

OTHER PUBLICATIONS

Hayward® PVC Ball Check Valves With EPDM O-Rings www.hayward-valves.com/check-valves/TC-CHECK-VALVES-PVC-EPDM.html Aug. 21, 2015.
Hayward® Product Manual, TC Series True Union Ball Check Valves, pp. 29-30, 2015.

\* cited by examiner

*Primary Examiner* — Craig Schneider
*Assistant Examiner* — P. Macade Nichols

(57) ABSTRACT

An apparatus to allow or stop an air or water passage into an enclosed environment comprises a housing, an air supply outlet, an air intake inlet, a ball, a gasket, an inlet air filter, an outlet air filter, wherein the ball is inside the housing and moves freely inside the housing, wherein the ball can reside on the gasket and temporarily forms seal to stop the air or water passage, and wherein the ball can be lifted by a lifting force to detach with the gasket when the lifting force is created by an pressure difference when ambient pressure above the gasket inside the housing is less than ambient pressure in the air intake inlet and when the lifting force is greater than the weight of the ball, wherein the air or water passage will flow through the housing and the air supply outlet when the ball is lifted.

9 Claims, 4 Drawing Sheets

ANTI-AIR LOCK NEGATIVE AND/OR VACUUM PRESSURE AIR ADMITTANCE CONNECTOR

CROSS-REFERENCE RELATED TO RELATED APPLICATIONS

This application claims the benefit and priority of U.S. Provisional Application No. 62/151,463, filed Apr. 23, 2015, which is hereby incorporated herein by reference in its entirety.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND

A variety of air admittance products have been made over the years for allowing air to enter a system under a negative or vacuum pressure and attaching these components to the system allows for proper airflow and venting as needed. Many of these products are specifically or only designed for systems such as piping systems and sewer systems where a local vent or air intake is not possible or due to the difficulty of running pipes through an already built home or structure therefore by connecting an air admittance component allows for easy installation of an air admittance connection and provides free or local air when needed for any negative pressure or vacuum which is created when water is flowing down the drain for instance thus to preventing siphoning of traps. Typically, these air admittance components only provide specific operating conditions such as the vacuum pressure in the amount of air required. All of the air admittance components, systems and parts available in the market today do not provide for an instantaneous and higher volume of air demand. And this causes a problem when existing air admittance components are installed on systems requiring the higher airflow demand.

This problem causes strain on the air admittance component and cause it to fail prematurely in addition it causes it to operate against its own design because it was designed to work on a natural gravity air flow vacuum or negative pressure constraint. And the result is that all air admittance components available today in the market either don't work properly or don't allow for enough airflow to enter the system upon demand when there is a higher demand and also proposes a problem of not working at all or failing immediately when a high airflow demand is required. Furthermore another problem is that air admittance components available do not filter the air and therefore can allow for corrosive environment to enter the system and damaging the Air admittance components.

For these reasons are users are disappointed when there is no product available on the market that they can use for a higher volume demand in a negative pressure scenario such as an enclosed pit with a pump requiring air to enter the system at the same rate of which it is pumping the water out. For instance a pump that can pump 20 gallons per minute and would require a large demand of airflow to enter the system so that a vacuum does not occur putting stress on the pump and causing the water discharge to not operate and discharge the water properly. In the case of a sump pump in many cases the pump becomes air locked and runs continuous which causes the pump to overheat, burnout and/or fail causing the area to flood and cause water damage to the building.

In many cases it is also required that after air enters the system that there is a proper seal in place to provide a radon gas, water and airtight seal after the air has been allowed to enter the system and when the pump disengages. It is also required that if failure is to occur on such an Air admittance component that it must fail in a closed/sealed position providing continued protection so that no air, water or radon gas can escape into the air within the building or within a certain high of the structures roof line on the exterior.

BRIEF SUMMARY OF THE INVENTION

This Brief Summary is included so as to introduce, in an abbreviated form, various topics to be elaborated upon below in the Detailed Description. This Brief Summary is not intended to identify key or essential aspects of the claimed invention. This brief Summary is similarly not intended for use as an aid in determining the scope of the claims.

The subject matters of this application overcomes the aforementioned problems and may be used as an apparatus to allow or stop an air or water passage into an enclosed environment comprises a housing, an air supply outlet, an air intake inlet, a ball, a gasket, an inlet air filter, an outlet air filter, wherein the ball is inside the housing and moves freely inside the housing, wherein the ball can reside on the gasket and temporarily forms seal to stop the air or water passage, and wherein the ball can be lifted by a lifting force to detach with the gasket when the lifting force is created by an pressure difference when ambient pressure above the gasket inside the housing is less than ambient pressure in the air intake inlet and when the lifting force is greater than the weight of the ball, wherein the air or water passage will flow through the housing and the air supply outlet when the ball is lifted.

The apparatus, or called anti-air lock negative and/or Vacuum pressure Air admittance connector, is an invention that allows for the required volume of air to enter an enclosed environment and seal and stop the enclosed environment once intake airflow is no longer required, under which radon gas, methane or other gas will stay in the enclosed system. The invention provides the proper seal before operation of a pump in an enclosed environment, and provides requiring the airflow to enter enclosed environment where there is an immediate need for air admittance due to the negative air pressure resulted from the operation of the pump.

BRIEF DESCRIPTION OF THE DRAWINGS

It should be understood that the drawings are merely representative, are not necessarily drawn to scale, and are not intended to limit the subject matter of this application.

DETAILED DESCRIPTION

Figure 1:
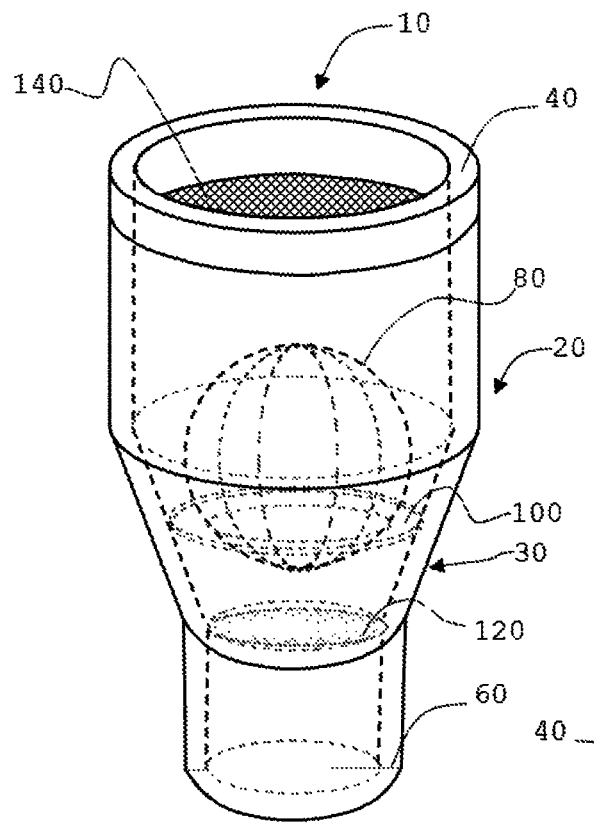
FIG. 1 is a perspective view of one of the embodiments of the invention.

Before the present invention is described in greater detail, it is to be understood that this invention is not limited to particular embodiments described, and as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Other than in the embodiment or example, or where indicated otherwise, all numbers indicating ingredient quantities and/or reaction conditions are to be understood as being modified in every instance by the word "about," which means the ingredient quantities or reaction conditions are within 10 percent to 15 percent of the indicated value.

Unless defined otherwise, all terms used herein have the same meaning as commonly understood by one of ordinary skill in the art to which this invention belongs. Although any methods and materials similar or equivalent to those described herein can be used in the practice or testing of the present invention, some potential and exemplary methods and materials may now be described. Any and all publications mentioned herein are incorporated herein by reference to disclose and describe the methods and/or materials in connection with which the publications are cited. It is understood that the present disclosure supersedes any disclosure of an incorporated publication to the extent there is a contradiction.

It must be noted that as used herein and in the appended claims, the singular forms "a", "an", and "the" may also include the plural referents unless the context clearly dictates otherwise.

It is further noted that the claims may be drafted to exclude any element that may be optional. As such, this statement is intended to serve as antecedent basis for use of such exclusive terminology as "solely", "only" and the like in connection with the recitation of claim elements, or the use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention.

Figure 2:
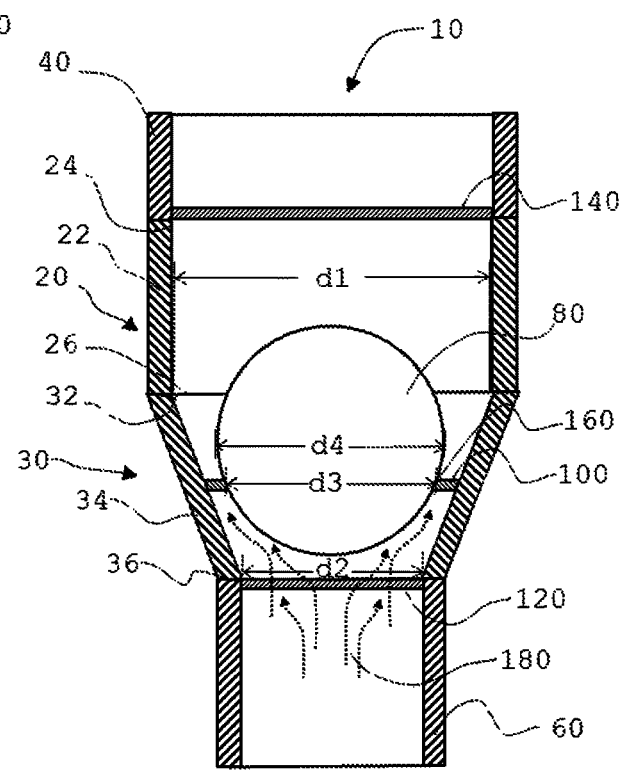
FIG. 2 is a section view of one of the embodiments of the invention showing the stop of air/water passage.

Referring to FIG. 1 and FIG. 2, one of the preferred embodiment of an apparatus 10 to allow or stop an air or water passage 180 into an enclosed environment 200 comprises a housing 20, an air supply outlet 40, an air intake inlet 60, a ball 80, a gasket 100, an inlet air filter 120, an outlet air filter 140, wherein said housing 20 is hollow inside, wherein said housing 20 further comprises a straight part 22 and a tapered part 30.

Referring to FIG. 2, wherein said straight part 22 further comprises a first end 24 and a second end 26, wherein said tapered part 30 further comprises a large end 32, a tapered body 34, and a small end 36, wherein said large end 32 of said tapered part 30 has an inner diameter d1, wherein said small end 36 of said tapered part 30 has an inner diameter d2, wherein said large end 32 of said tapered part 30 is connected with said second end 26 of said straight part 22 of said housing 20, wherein said small end 36 of said tapered part 30 is connected to said air intake inlet 60 or alternatively connected with said inlet air filter 120, wherein said first end 24 of said straight part 22 is connected with said air supply outlet 40, wherein said outlet air filter 140 is connected with air supply outlet 40 or alternatively connected with said straight part 22 of said housing 20, wherein said gasket 100 is inside the housing 20 and is disposed on said tapered body 34 between said large end 32 and said small end 36 of said tapered part 30 of said housing 20, wherein said gasket 100 has an inner diameter d3, wherein said ball 80 has an diameter d4 between said inner diameter d3 of said gasket 100 and said inner diameter d1 of said large end 32 of said tapered part 30, wherein said ball 80 is inside said housing 20 and moves freely inside said housing 20, wherein said ball 80 can reside on the gasket 100, substantially contacted with the gasket 100, and temporarily forms a seal 160 to stop said air or water passage 180.

Also referring to FIG. 1 and FIG. 2, in preferred one embodiment, gasket 100 is made of flexible material, such as rubber having a Shore Hardness about 60 A, so that the ball 80 will substantially contact with the gasket 100 when the ball 80 resides on the gasket 100 and temporarily creates a seal 160 to prevent gas and air to pass through the apparatus 10. The ball 80 will resides on the gasket 100 by gravity.

Also referring to FIG. 1 and FIG. 2, in one embodiment, said inlet air filter 120 and said outlet air filter 140 prevents particles and pollutants in said air or water passage 180 from entering said housing 20 and prevents said particles and pollutants from depositing on the gasket 100, which will be detrimental to said seal 160 between said ball 80 and said gasket 100. The air supply outlet 40 and the air intake inlet 60 can be any types of pipe connection, such as but not limited to fastener, treaded pipe, solvent welding, soldering, brazing, welding compression fittings, or crimped. The material of air supply outlet 40, the air intake inlet 60, and the housing 20 can be such as but not limited to plastic, copper, brass, cast iron, steel, and other commonly used in the field of art of piping.

Also referring to FIG. 1 and FIG. 2, in one embodiment, the inlet air filter 120 and the outlet air filter 140 is made of stainless steel and has filter particles equal or larger than 300 micron. However, the material of the inlet air filter 120 and the outlet air filter 140 can be other types of material that can sustain high humidity, erosive environment, such as but not limited to rubber, plastic, Teflon, and galvanized steel.

Figure 3:
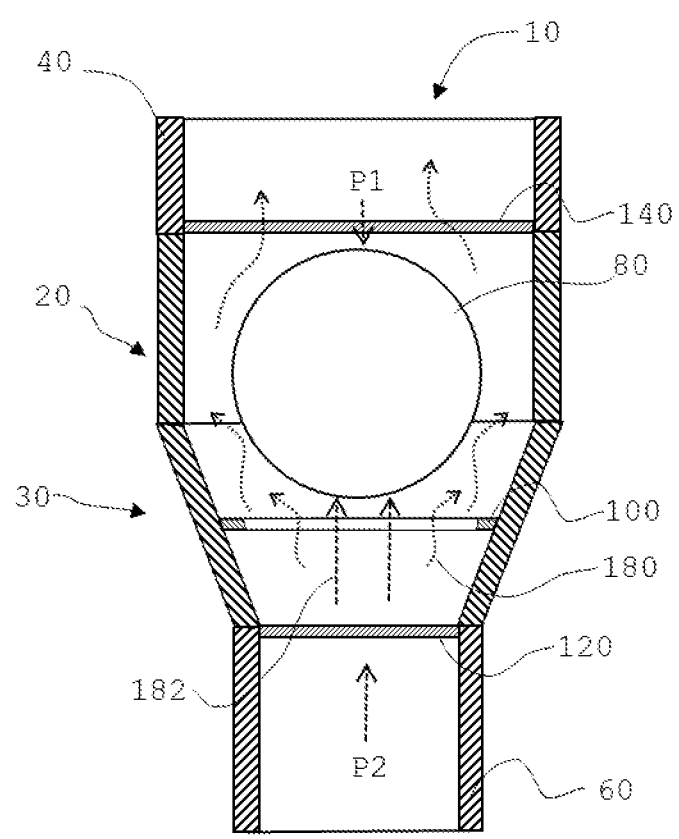
FIG. 3 is a section view of one of the embodiments of the invention showing the passing air/water passage.

Referring to FIG. 3, said ball 80 can be lifted by a lifting force 182 to detach said ball 80 from said gasket 100 when said lifting force 182 is created by an pressure difference when a ambient pressure P1 above said gasket 100 is less than a ambient pressure P2 in the air intake inlet 60 and when said lifting force 182 is greater than a weight of said ball 80, and wherein said pressure difference is calculated by subtracting said air pressure P2 in air intake inlet 60 from said ambient pressure P1 in the enclosed environment 200. In one preferred embodiment of the invention, an air pressure P2 in the air intake inlet 60 is about 8.7 pounds per square inch (60 Kilopascal) greater than the ambient pressure P1 above said gasket 100, wherein said air or water passage 180 will flow through said housing 20 and said air supply outlet 40 when said ball 80 is lifted. The weight of the ball 80 can be depended on the said pressure difference that the apparatus 10 is designed to control under that situation to stop or allow the air or water passage. In one preferred embodiment of the invention, the ball 80 is weighed about one pound and one ounce. In one preferred embodiment of the invention, the ball 80 is round and is metal inside and covered with rubber exterior. In one preferred embodiment of the invention, the seal 160 can sustain about 8.7 pounds per square inch (60 Kilopascal) of the pressure created by water, air, or gas to escape from the seal 160.

Figure 4:
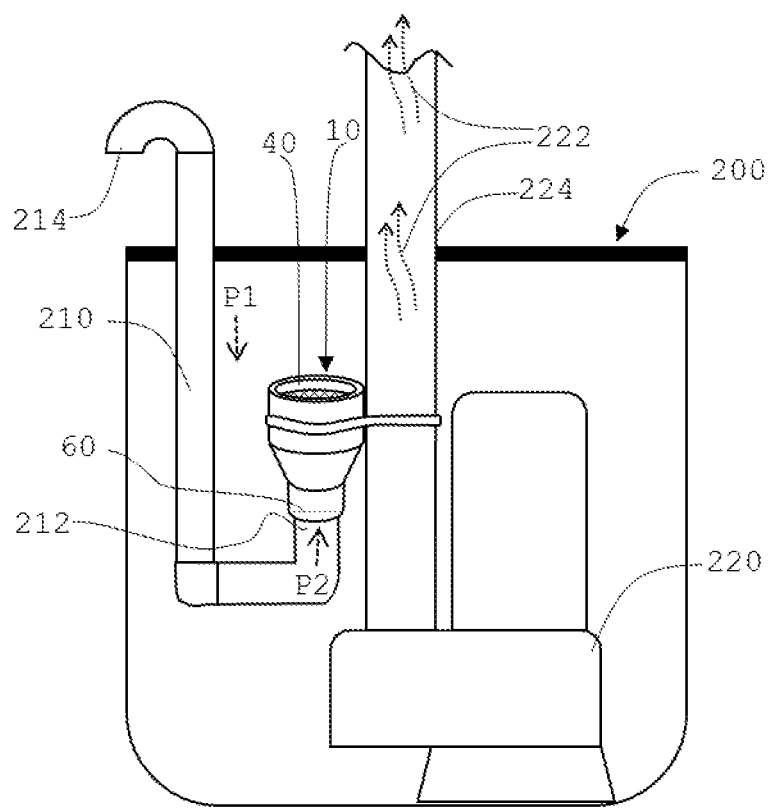
FIG. 4 is a schematic view of one of the embodiments of the invention inside an enclosed environment.

Referring to FIG. 4 and FIG. 3, in one embodiment of the apparatus 10, said apparatus 10 is inside an enclosed environment 200, wherein said enclosed environment 200 has an ambient pressure P1 in said enclosed environment 200, wherein said enclosed environment 200 further comprises at least one conduit 210, wherein each said at least one conduit 210 has a first end 212 and a second end 214, wherein each of said at least one conduit 210 has said first end 212 connected to said air intake inlet 60 of said apparatus 10 and said second end 214 extends out of said enclosed environment 200, wherein said air supply outlet 40 is opened and adopted to said ambient pressure P1 of said enclosed environment 200, wherein said enclosed environment 200 has at least one pump 220, which conveys water and/or air 222 in said enclosed environment 200 to outside said enclosed environment 200, and wherein said at least one pump 220 causes a said pressure difference to said apparatus 10 when said at least one pump 220 conveys water and/or air 222 through at least one pipe 224 out of said enclosed environment 200 and causes said ambient pressure P1 in the enclosed environment 200 to drop below said air pressure P2 in said air intake inlet 60. The pressure difference creates a lifting force 182 (FIG. 3) to lift the ball 80 (FIG. 3) off the gasket 100 (FIG. 3) to allow air or water passage 180. In one preferred embodiment, the apparatus 10 is designed to provide at least air or water passage 180 of 12 Cubic Inch/Second per each Millimeter of pipe 224 of said at least one pump 220.

Figure 5:
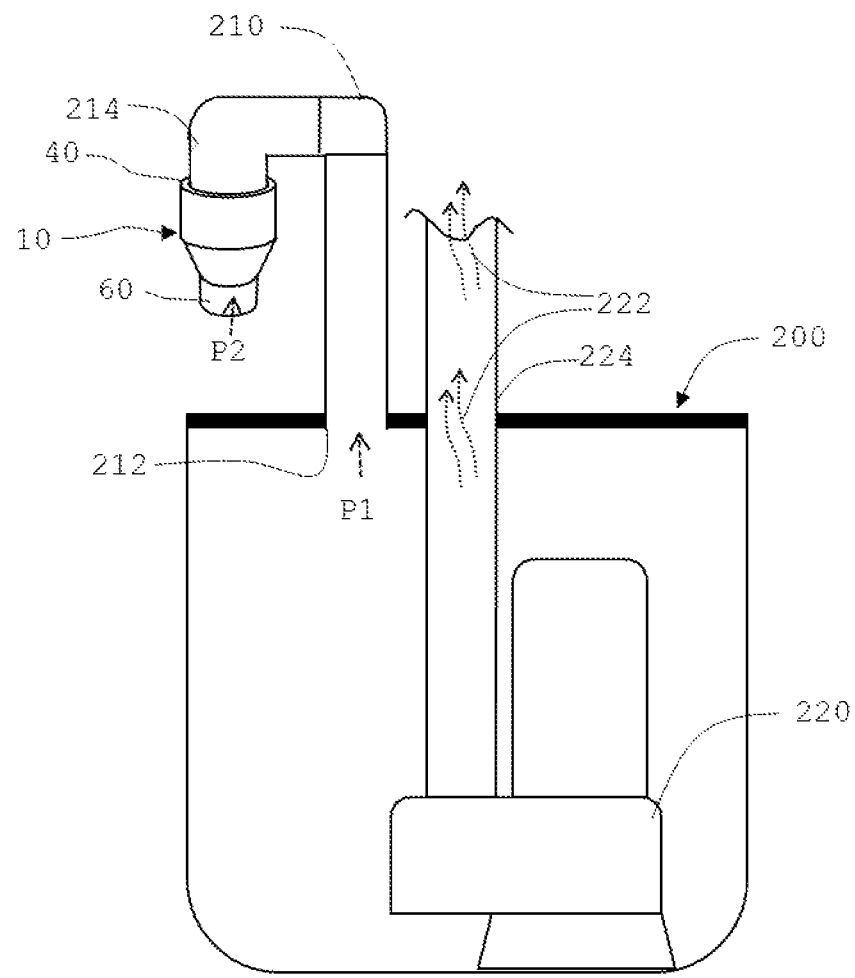
FIG. 5 is a schematic view of one of the embodiments of the invention outside an enclosed environment.

Referring to FIG. 5 and FIG. 3, in one embodiment of the apparatus 10, said apparatus 10 is outside an enclosed environment 200, wherein said enclosed environment 200 has an ambient pressure P1 in said enclosed environment 200, wherein said enclosed environment 200 further comprises at least one conduit 210, wherein each said at least one conduit 210 has a first end 212 and a second end 214, wherein each of said at least one conduit 210 has said first end 212 connected to said air supply outlet 40 of said apparatus 10 and said second end 214 extends into said enclosed environment 200, wherein said air supply outlet 40 is opened and adopted to said ambient pressure P1 of said enclosed environment 200, wherein said enclosed environment 200 has at least one pump 220, which conveys water and/or air 222 in said enclosed environment 200 to outside said enclosed environment 200, and wherein said at least one pump 220 causes a said pressure difference to said apparatus 10 when said at least one pump 220 conveys water and/or air 222 through at least one pipe 224 out of said enclosed environment 200 and causes said ambient pressure P1 in the enclosed environment 200 to drop below said air pressure P2 in said air intake inlet 60. The pressure difference creates a lifting force 182 (FIG. 3) to lift the ball 80 (FIG. 3) off the gasket 100 (FIG. 3), wherein said air or water passage 180 will flow through said housing 20 and said air supply outlet 40 when said ball 80 is lifted.

What claimed is:

1. An apparatus to allow or stop an air or water passage into an enclosed environment comprising:
    a housing,
    an air supply outlet,
    an air intake inlet,
    a ball,
    a gasket,
    an inlet air filter,
    an outlet air filter,
    wherein said housing is hollow inside,
    wherein said housing further comprises a straight part and a tapered part,
    wherein said straight part further comprises a first end and a second end,
    wherein said tapered part further comprises a large end, a tapered body, and a small end,
    wherein said large end of said tapered part has an inner diameter,
    wherein said small end of said tapered part has an inner diameter,
    wherein said large end of said tapered part is connected with said second end of said straight part of said housing,
    wherein said small end of said tapered part is connected to said air intake inlet or alternatively connected with said inlet air filter,
    wherein said inlet air filter is connected with said air intake inlet or alternatively connected with said small end of said tapered part,
    wherein said first end of said straight part is connected with said air supply outlet or alternatively connected with said outlet air filter,
    wherein said outlet air filter is connected with said air supply outlet or alternatively connected with said straight part of said housing,
    wherein said gasket is inside the housing and is disposed on said tapered body between said large end and said small end of said tapered part of said housing,
    wherein said gasket has an inner diameter,
    wherein said ball has a diameter between said inner diameter of said gasket and said inner diameter of said large end of said tapered part,
    wherein said ball is inside said housing and moves freely inside said housing,
    wherein said ball can reside on the gasket and temporarily forms a seal to stop said air or water passage,
    wherein said ball can be lifted by a lifting force to detach with said gasket when said lifting force is created by a pressure difference when an ambient pressure above said gasket inside said housing is less than an air pressure in the air intake inlet and when said lifting force is greater than a weight of said ball, and
    wherein said air or water passage will flow through said housing and said air supply outlet when said ball is lifted.

2. The apparatus of claim 1, wherein said pressure difference is equal to or greater than about 8.7 pounds per square inch (60 Kilopascal).

3. The apparatus of claim 1, wherein said weight of said ball is about one pound and one ounce.

4. The apparatus of claim 1, wherein said gasket is made of a flexible material, which can be substantially contacted with said ball to create said seal.

5. The apparatus of claim 1, wherein said inlet air filter prevents particles and pollutants in said air or water passage from entering said housing and prevents said particles and pollutants from depositing on the gasket, which will be detrimental to said seal between said ball and said gasket.

6. The apparatus of claim 1, wherein said outlet air filter prevents particles and pollutants in said air or water passage from entering said housing and prevents said particles and pollutants from depositing on the gasket, which will be detrimental to said seal between said ball and said gasket.

7. The apparatus of claim 1, wherein said apparatus is inside said enclosed environment,
   wherein said enclosed environment has an ambient pressure in said enclosed environment,
   wherein said enclosed environment further comprises at least one conduit,
   wherein each said at least one conduit has a first end and a second end,
   wherein each of said at least one conduit has said first end connected to said air intake inlet of said apparatus and said second end extends out of said enclosed environment,
   wherein said air supply outlet is opened and adopted to said ambient pressure of said enclosed environment,
   wherein said enclosed environment has at least one pump, which conveys water and/or air in said enclosed environment to outside said enclosed environment, and
   wherein said at least one pump causes said pressure difference to said apparatus when said at least one pump conveys water and/or air outside said environment and causes said ambient pressure in the enclosed environment, said ambient pressure in said air supply outlet, and said ambient pressure in said housing above said gasket to drop below said air pressure in said air intake inlet.

8. The apparatus of claim 1, wherein said apparatus is outside said enclosed environment,
   wherein said enclosed environment has an ambient pressure in said enclosed environment,
   wherein said enclosed environment further comprises at least one conduit,
   wherein each said at least one conduit has a first end and a second end,
   wherein each of said at least one conduit has said first end connected to said air supply outlet of said apparatus and said second end extends inside to said enclosed environment,
   wherein said air supply outlet is opened and adopted to said ambient pressure of said enclosed environment,
   wherein said enclosed environment has at least one pump, which conveys water and/or air in said enclosed environment to outside said enclosed environment, and
   wherein said at least one pump causes a said pressure difference to said apparatus when said at least one pump conveys water and/or air outside said environment and cause said ambient pressure in the enclosed environment, said ambient pressure in said air supply outlet, and said ambient pressure in said housing above said gasket to drop below said air pressure in said air intake inlet.

9. An apparatus to allow or stop an air or water passage into an enclosed environment comprising:
   a housing,
   an air supply outlet,
   an air intake inlet,
   a ball,
   a gasket,
   an inlet air filter,
   an outlet air filter,
   wherein said housing is hollow inside,
   wherein said housing further comprises a straight part and a tapered part,
   wherein said straight part further comprises a first end and a second end,
   wherein said tapered part further comprises a large end, a tapered body, and a small end,
   wherein said large end of said tapered part has an inner diameter,
   wherein said small end of said tapered part has an inner diameter,
   wherein said large end of said tapered part is connected with said first end of said straight part of said housing,
   wherein said small end of said tapered part is connected to said air intake inlet or alternatively connected with said inlet air filter,
   wherein said inlet air filter is connected with said air intake inlet or alternatively connected with said small end of said tapered part,
   wherein said second end of said straight part is connected with said air supply outlet or alternatively connected with said outlet air filter,
   wherein said outlet air filter is connected with said air supply outlet or alternatively connected with said straight part of said housing,
   wherein said gasket is inside the housing and is disposed on said tapered body between said large end and said small end of said tapered part of said housing,
   wherein said gasket has an inner diameter,
   wherein said ball has diameter between said inner diameter of said gasket and said inner diameter of said large end of said tapered part,
   wherein said ball is inside said housing and moves freely inside said housing,
   wherein said ball can reside on the gasket and temporarily forms a seal to stop said air or water passage,
   wherein said ball can be lifted by a lifting force to detach with said gasket when said lifting force is created by a pressure difference when an ambient pressure above said gasket inside said housing is less than an ambient pressure in the air intake inlet and when said lifting force is greater than a weight of said ball,
   wherein said air or water passage will flow through said housing and said air supply outlet when said ball is lifted,
   wherein said pressure difference is equal to or greater than about 8.7 pounds per square inch (60 Kilopascal),
   wherein said weight of said ball is about 1 pound and 1 ounce,
   wherein said gasket is made of a flexible material, which can be substantially contacted with said ball to temporarily create said seal,
   wherein said inlet air filter prevents particles and pollutants in said air or water passage from entering said housing and prevents said particles and pollutants from depositing on the gasket, which will be detrimental to said seal between said ball and said gasket, and
   wherein said inlet air filter prevents particles and pollutants in said air or water passage from entering said housing and prevents said particles and pollutants from depositing on the gasket, which will be detrimental to said seal between said ball and said gasket.

\* \* \* \* \*